United States Patent [19]

Matthews

[11] Patent Number: 5,067,445

[45] Date of Patent: Nov. 26, 1991

[54] DEVICE FOR CAPTURING AND RESTRAINING ANIMALS

[76] Inventor: Donald H. Matthews, 20 Quaker Bottom Rd., Sparks, Md. 21152

[21] Appl. No.: 604,945

[22] Filed: Oct. 29, 1990

[51] Int. Cl.$^5$ ............................................. A01K 27/00
[52] U.S. Cl. .................................... 119/152; 119/151
[58] Field of Search ............... 119/152, 153, 154, 151, 119/96

[56] References Cited

U.S. PATENT DOCUMENTS

| 320,167 | 6/1885 | Ramm | 119/152 |
|---------|--------|------|---------|
| 445,663 | 2/1891 | Stiles | 119/152 |
| 884,156 | 4/1908 | Hitt | 119/152 |
| 956,932 | 5/1910 | Burch | 119/152 |
| 1,862,472 | 6/1932 | Fisher | 119/152 |
| 3,099,982 | 8/1963 | Arndt | 119/152 |

Primary Examiner—John G. Weiss
Attorney, Agent, or Firm—Leonard Bloom

[57] ABSTRACT

A device for capturing and restraining animals. The device includes a staff having a main body, a handle portion and a crook portion that terminates in a crook end. A restraining loop is pivotally secured to and carried by the body portion substantially opposite to the crook end. A contact loop is also pivotally secured to and carried by the body portion substantially opposite to the crook end. The contact loop and the restraining loop are associated with one another for concommittant pivotal movement. When the animals neck is moved into the crook end, it contacts the contact loop and concommittantly pivots the loops, so that the restraining loop contacts the crook end. This closes the crook portion of the device for capturing and restraining the animal therein.

7 Claims, 1 Drawing Sheet

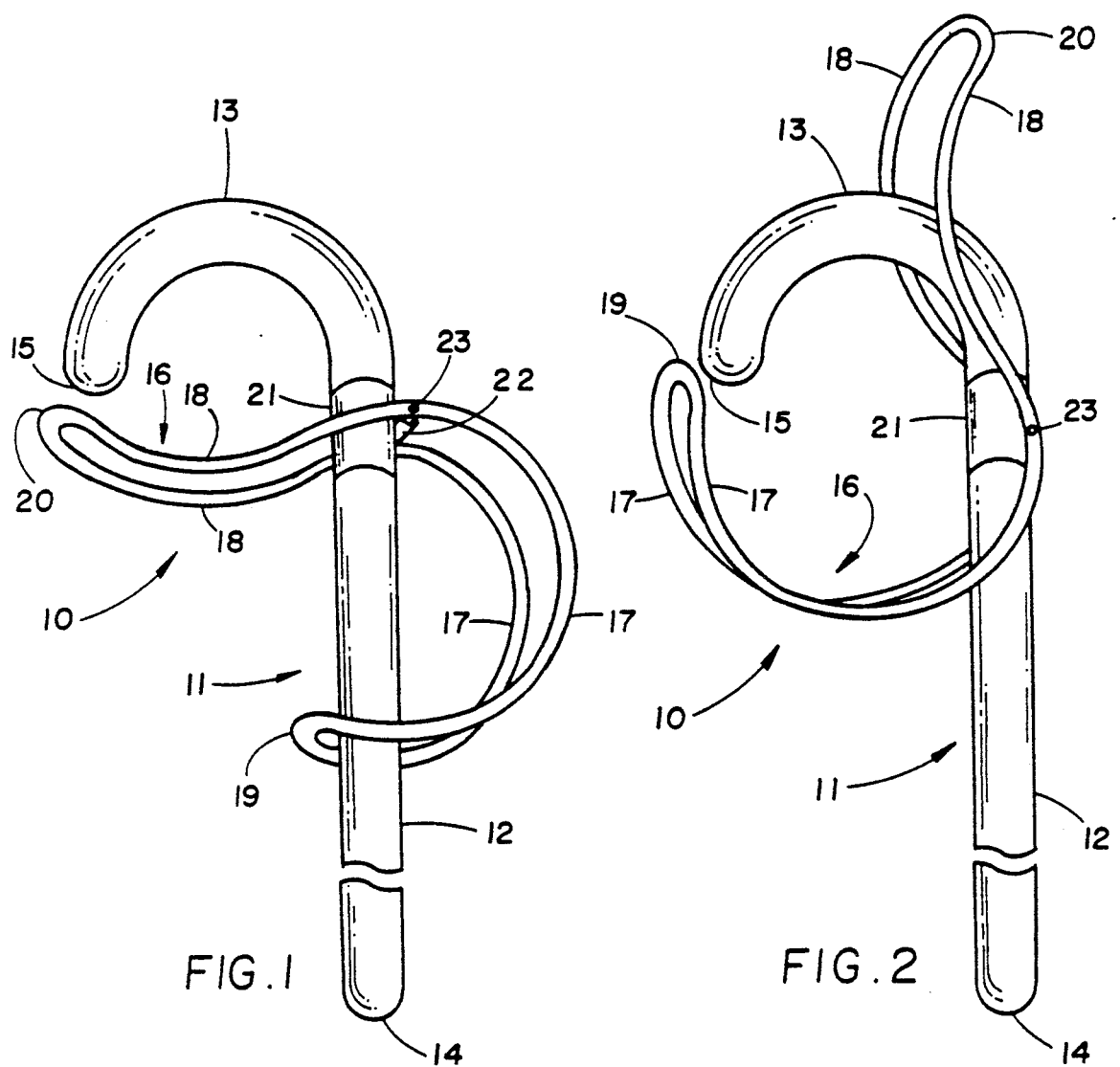
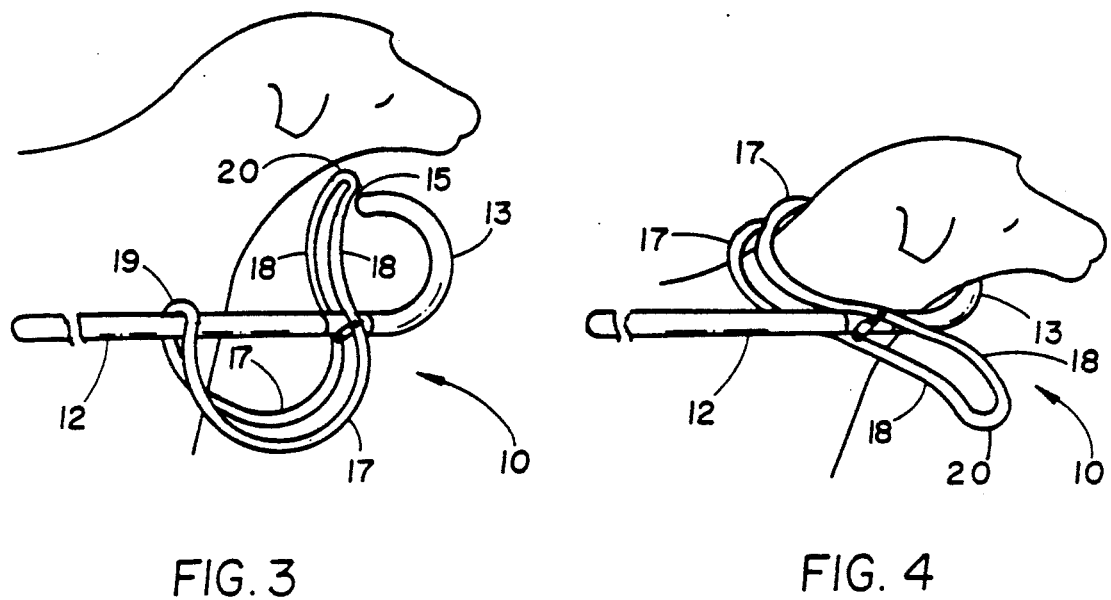

DEVICE FOR CAPTURING AND RESTRAINING ANIMALS

FIELD OF THE INVENTION

The present invention relates to devices for capturing and restraining animals and, in particular, to shepherd's crooks for capturing and restraining sheep.

BACKGROUND OF THE INVENTION

There are many devices, of which I am aware, for capturing and restraining animals and, in particular, farm animals and herd livestock. All such devices have as their aim to aid a person, such as a farmer or shepherd, to capture and restrain the animal without injuring the animal. A further objective is to provide increased restraint and to reduce the effort required to be exerted by the animal handler during restraint. Examples of such devices are exemplified by the following U.S. Patents:

| U.S. Pat. No. | Inventor | Date of Issue |
| --- | --- | --- |
| 222,850 | Wellman | Dec. 23, 1879 |
| 338,606 | Morley | March 23, 1886 |
| 635,543 | Herr | Oct. 24, 1899 |
| 673,629 | Thurmond | May 7, 1901 |
| 956,932 | Burch | May 3, 1910 |

Unfortunately, the devices of which I am aware suffer from at least one of several drawbacks that have limited their use. First, each of the devices captures and restrains the animal by capturing and holding either the leg or snout of the animal which can easily lead to injury of the animal when it struggles to get loose, especially since the animal is being held by a portion of the body that is easily subject to such injury as a result of such struggling. Second, none of these devices provide any sort of tranquilizing effect whatsoever that would minimize the struggling of the captive animal and, thus, would reduce both the possibility of injury to the animal, as well as the effort required to be exerted by the handler during restraining. Finally, these devices are all specialized and rather complicated and none are capable of being retrofit to existing restraint devices.

Accordingly, it can be seen that there remains a need for a simple and inexpensive device that can capture and restrain an animal by holding a portion of the animal's body that provides maximum control over the animal, thereby minimizing the possibility that the animal will struggle and concomitantly minimizing the possibility of injury to an animal captured thereby. There further remains a need for such a device that tranquilizes the restrained animal, thereby minimizing both the risk of injury to the animal and the effort required to restrain the animal.

SUMMARY OF THE INVENTION

It is a primary object of the present invention to provide a device for capturing and restraining animals that is inexpensive and simple to fabricate and use.

It is a further object of the present invention to provide such a device that may be retrofit to existing devices.

It is a further primary object of the present invention to provide a device that is capable of capturing and restraining an animal by a part of the animals anatomy, such as the animals neck, that provides the maximum control of the animal, thereby minimizing the struggling of the animal, the potential for causing physical injury to the animal, and the effort required to be exerted by the animal handler during restraint.

It is a further object of the present invention to provide such a device that also has a tranquilizing effect on the restrained animal, further minimizing the struggling of the animal, the potential for injury thereto, and the effort required to be exerted by the handler during restraint.

In accordance with the teachings of the present invention, a device is disclosed for capturing and restraining animals that captures and restrains an animal by holding its neck. This device includes a staff having a crook portion terminating in a crook end. A restraining loop is pivotally secured to and carried by the staff at a level that is substantially opposite the crook end. When the animals neck is moved into the crook portion of the staff, by either the movement of the staff and/or the movement of the animal, the restraining loop may be pivoted into contact with the crook end, thereby closing the crook portion. In this fashion, the animal is captured and restrained therein.

Preferably, the restraining loop is shaped, such that when in contact with the crook portion, the restraining loop exerts a slight pressure on the rear of the captured animals neck. In this fashion, a tranquilizing effect on the animal is provided, further calming the captured animal and minimizing the struggling of the animal, the potential for injury thereto, and the effort required to be exerted by the handler during restraint.

In further accordance with the teachings of the present invention, it is preferred to further provide a contact loop that is integral with the restraining loop, so as to extend outward oppositely therefrom for concomitant pivotal movement therewith. The contact loop is, before the neck of the animal is moved into the crook portion, located across the crook portion. In this manner, when moved into the crook portion, the animals neck contacts the contact loop, pivoting the restraining loop into contact with the crook end, thereby closing the crook portion for capturing and restraining the animal.

In a preferred embodiment, the device of the present invention is a shepherd's crook for capturing and restraining sheep.

These and other objects of the present invention will become readily apparent from a reading of the following specification, taken in conjunction with the enclosed drawings.

BRIEF DESCRIPTION OF THE DRAWINGS

FIG. 1 is a perspective view of the device of the present invention.

FIG. 2 is another perspective view of the device of the present invention.

FIG. 3 and 4 illustrate the device of the present invention embodied as a shepherd's crook to capture and restrain sheep.

FIG. 3 illustrates the device being moved into contact with the neck of a sheep, so that the sheep's neck is moved into the crook portion.

FIG. 4 illustrates the device with the neck of a sheep in the crook portion, such that the sheep is captured and restrained by the device.

DESCRIPTION OF PREFERRED EMBODIMENT

Referring now to the drawings, the device 10 of the present invention is illustrated and described in the context of a shepherd's crook for capturing and restraining sheep.

With particular reference now to FIGS. 1 and 2, the shepherd's crook 10 includes a staff or body portion 11 that has an elongated handle portion 12 and an arcuate crook portion 13, that is integral with the handle portion 12. The handle portion 12 terminates in a handle end 14 that is remote from the crook portion 13. The crook portion 13 terminates in a crook end 15 that is substantially opposite from the handle portion 12.

Pivotally (or rotatably) joined to and carried by the staff 11 (by appropriate means) is as least one restraining member 16. Preferably, two such restraining members 16 are provided being positioned substantially parallel to one another on opposite sides of the staff 11. It is further preferred that members 16 be in an S-shape, to form S-shaped members, as is seen in the drawings.

Each of the members 16 includes respective restraining loops 17 and contact loops 18 that are integral, so that the loops 17 and 18 extend oppositely from one another.

It is to be noted here that, if desired, the contact loops 18 may be omitted. In such an event, it is contemplated herein that the member 16 will alternatively include a handle or other structure that would permit the manual movement (pivotal or rotational) thereof. However, it is to be understood that the provision of such a handle is not required.

In the event that two members 16 are provided, the ends (the one ends) of the restraining loops 17 are, preferably, joined to one another by a restraining hook 19. Furthermore, the ends (the one ends) of the contact loops 18 are, preferably, joined to one another by a contact hook 20.

Fixed to the staff 11 at a position being substantially opposite to the crook end 15 is a ferrule 21. A sleeve 22 is fixed to the ferrule 21. Sleeve 22 is disposed on a longitudinal axis that is substantially perpendicular to the ferrule 21. A pivot pin 23 is pivotally (or rotatably) disposed in and carried by the sleeve 22. The pivot pin 23 is, in turn, integral with each of the members 16 substantially intermediate of the respective restraining loops 17 and contact loops 18 thereof. In this respect, it is noted that, if desired, the pin 23 may be integral with either the respective restraining loops 17 and/or contact loops 18.

Together, the ferrule 21, sleeve 22 and pin 23 define a means for pivotally (or rotationally) securing the member(s) 16 to the staff 11 for pivotal (or rotational) movement of said member(s) 16. In this manner, when an animal's neck is moved into the crook portion 13, either by movement of the staff 11 and/or by movement of the animal, the neck of the animal will contact the contact loop 18 (FIG. 3). Such contact pivots (or rotates) the member 16, such that the restraining hook 19 of the restraining loop 17 moves behind the animal's neck and into contact with (and catches) the crook end 15, thereby closing the crook end 15 and capturing and restraining the animal therein (FIG. 2).

In use, loops 17 and 18 are positioned on the staff 1 in an open position, as shown in FIGS. 1, 2 and 3. An animal is approached from the rear and the crook portion 13 is brought forward of the animal's neck. The staff 11 is then pulled rearwardly, bringing the contact loop(s) 18 into contact with the animal's neck or throat. Further rearward movement of the staff 11 pivots loop(s) 18 over the crook portion 13 and swings or pivots (or rotates) the restraining loop 17 around the back of the animal's neck to close the open end of the crook portion 13. The animal is then securely captured and easily restrained for handling (FIG. 4).

Although the animal could elude capture or escape restraint by backing away from the approaching crook portion 13, one it is captured, the animal does not do so. Rather, the animal's instinctive reaction is to plunge forward while shaking or bobbing its head. In such a case, the animal is easily prevented from escaping by maintaining a steady rearward force on the staff 11. Furthermore, the slight pressure on the rear of the animal's neck exerted by the restraining loop 17 after capture of the animal has an apparent tranquilizing effect on the animal, so that the animals restrained by use of the device 10 are calmed sooner for easier handling than would occur with use of a conventional crook.

In any event, if desired, a latch may be located at the crook end 15 for catching and capturing the restraining hook 19, thereby locking the loop 17 in the closed position.

As can be seen, use of the device 10 of the present invention increases the ease of capturing an animal, provides increased restraint of a captured animal and reduces the possibility of injury to the captured animal, as well as the effort required to be exerted by the animal handler during restraint.

As can further be seen, a traditional shepherd's crook may be retrofit with the ferrule 21, sleeve 22, pivot pin 23 members 16 (having loops 16 and 17), in order to form the device of the present invention.

Obviously, many modifications may be made without departing from the basic spirit of the present invention. Accordingly it will be appreciated by those skilled in the art that within the scope of the appended claims, the invention may be practiced other than has been specifically described herein.

What is claimed is:

1. A device for capturing and restraining animals, comprised of:
   a main body having a handle portion and a crook portion; and
   at least one S-shaped member having a restraining loop formed in the one end thereof and a contact loop formed in the other end thereof, the S-shaped member being pivotally secured to and carried by the main body substantially opposite the crook end, such that when an animal's neck is moved into the crook end, the animal's neck contacts the contact loop and pivots the restraining loop into contact with the crook end, thereby closing the crook portion for capturing and restraining the animal therein.

2. A shepherd's crook, comprising:
   a staff having a crook portion terminating in a crook end;
   at least one S-shaped member having a restraining loop formed in the one end thereof and a contact loop formed in the other end thereof, the S-shaped member being pivotally secured to and carried by the main body substantially opposite the crook end, such that when an animal's neck is moved into the crook portion, the animal's neck contacts the contact loop and pivots the restraining loop into contact with the crook end, thereby closing the crook portion for capturing and restraining the animal therein.

3. The shepherd's crook of claim 2, wherein the restraining loop is shaped so that when the animal is captured and restrained therein, the restraining loop exerts a slight pressure on the rear of the animal's neck, such that a tranquilizing effect on the animal is produced thereby.

4. The shepherd's crook of claim 2, further comprising:
a ferrule fixed to the main body substantially opposite to the crook end, a sleeve fixed to the ferrule on a longitudinal axis being perpendicular to the ferrule, and a pivot pin pivotally disposed in and carried by the sleeve, the pivot pin being secured to the restraining loop, such that the restraining loop is pivotally secured to and carried by the main body.

5. The shepherd's crook of claim 2, wherein a pair of parallel S-shaped members are provided being located on opposite sides of the staff, the parallel members being connected together at one end thereof by a hook, such that when the animal's neck is moved into the crook portion of the staff, the contact loops may be pivoted over the crook portion while the restraining loops are pivoted into contact with the crook end for capturing and restraining the animal therein.

6. A shepherd's crook, comprising:
a staff having a crook portion terminating in a crook end;
at least one S-shaped member having a restraining loop formed in the one end thereof and a contact loop formed in the other end thereof, the S-shaped member being pivotally secured to and carried by the main body substantially opposite the crook end, such that when an animal's neck is moved into the crook portion, the animal's neck contacts the contact loop and pivots the restraining loop into contact with the crook end, thereby closing the crook portion for capturing and restraining the animal therein;
wherein the restraining loop is shaped so that when the animal is captured and restrained therein, the restraining loop exerts a slight pressure on the rear of the animal's neck, such that a tranquilizing effect on the animal is produced thereby; and
a ferrule fixed to the main body substantially opposite to the crook end, a sleeve fixed to the ferrule on a longitudinal axis being perpendicular to the ferrule, and a pivot pin pivotally disposed in and carried by the sleeve, the pivot pin being secured to the restraining loop, such that the restraining loop is pivotally secured to and carried by the main body.

7. A shepherd's crook, comprising:
a staff having a crook portion terminating in a crook end;
a pair of parallel S-shaped members located on opposite sides of the staff, each of the S-shaped members having a respective restraining loop formed in the one ends thereof and a respective contact loop formed in the other ends thereof, the restraining loops of the parallel members being connected together at one end thereof by a hook, the S-shaped members being pivotally secured to and carried by the main body substantially opposite the crook end, such that when an animal's neck is moved into the crook portion, the animal's neck contacts the contact loops and pivots the restraining loops into contact with the crook end, thereby closing the cork portion for capturing and restraining the animal therein;
wherein the restraining loops are shaped so that when the animal is captured and restrained therein, the restraining loops exert a slight pressure on the rear of the animal's neck, such that a tranquilizing effect on the animal is produced thereby; and
a ferrule fixed to the main body substantially opposite to the crook end, a sleeve fixed to the ferrule on a longitudinal axis being perpendicular to the ferrule, and a pivot pin pivotally disposed in and carried by the sleeve, the pivot pin being secured to the S-shaped members, such that the members are pivotally secured to and carried by the main body.

* * * * *